(No Model.) 2 Sheets—Sheet 1.
W. TUNSTILL.
ROTARY ICE PICK.
No. 390,998. Patented Oct. 9, 1888.
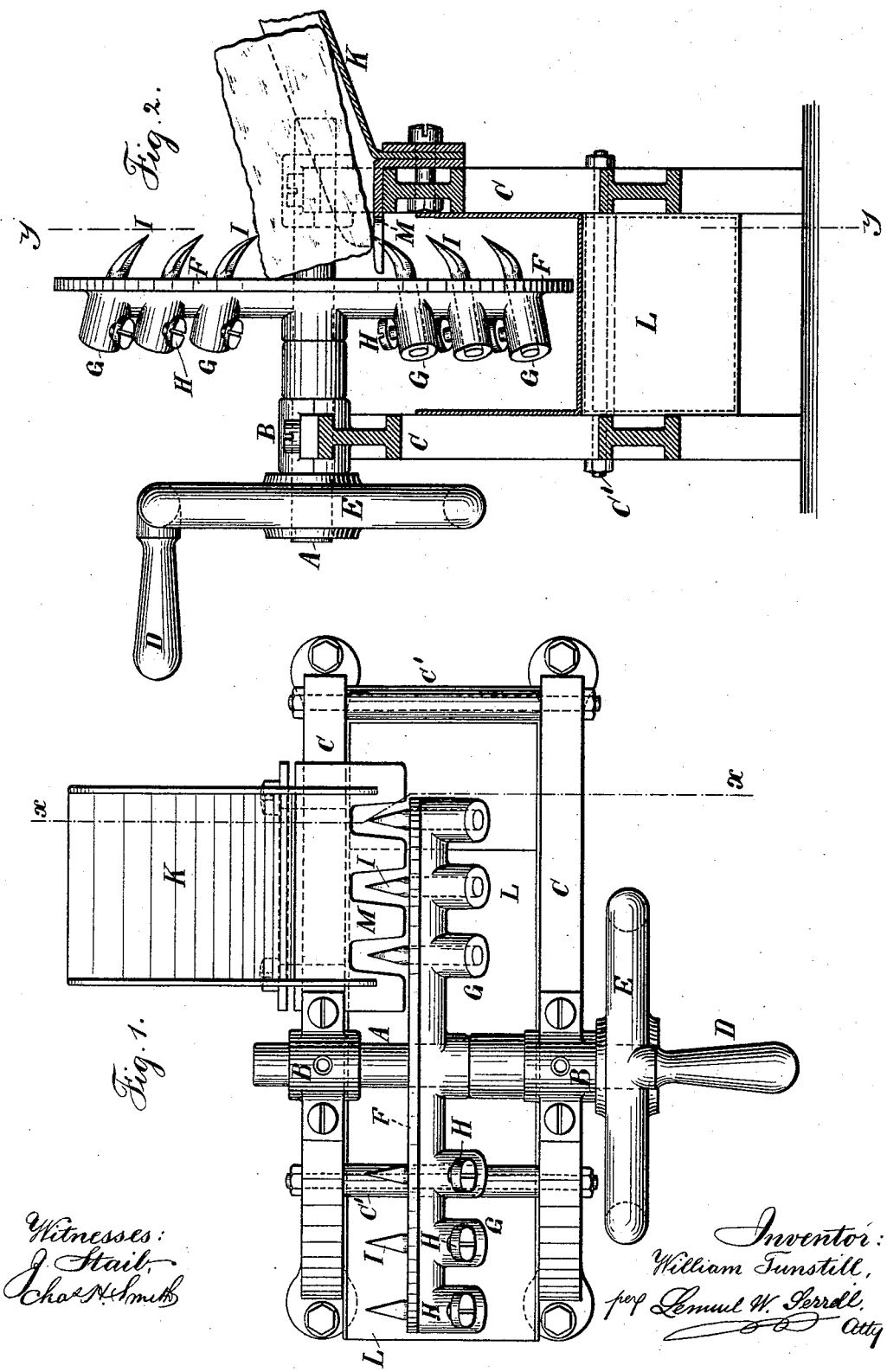

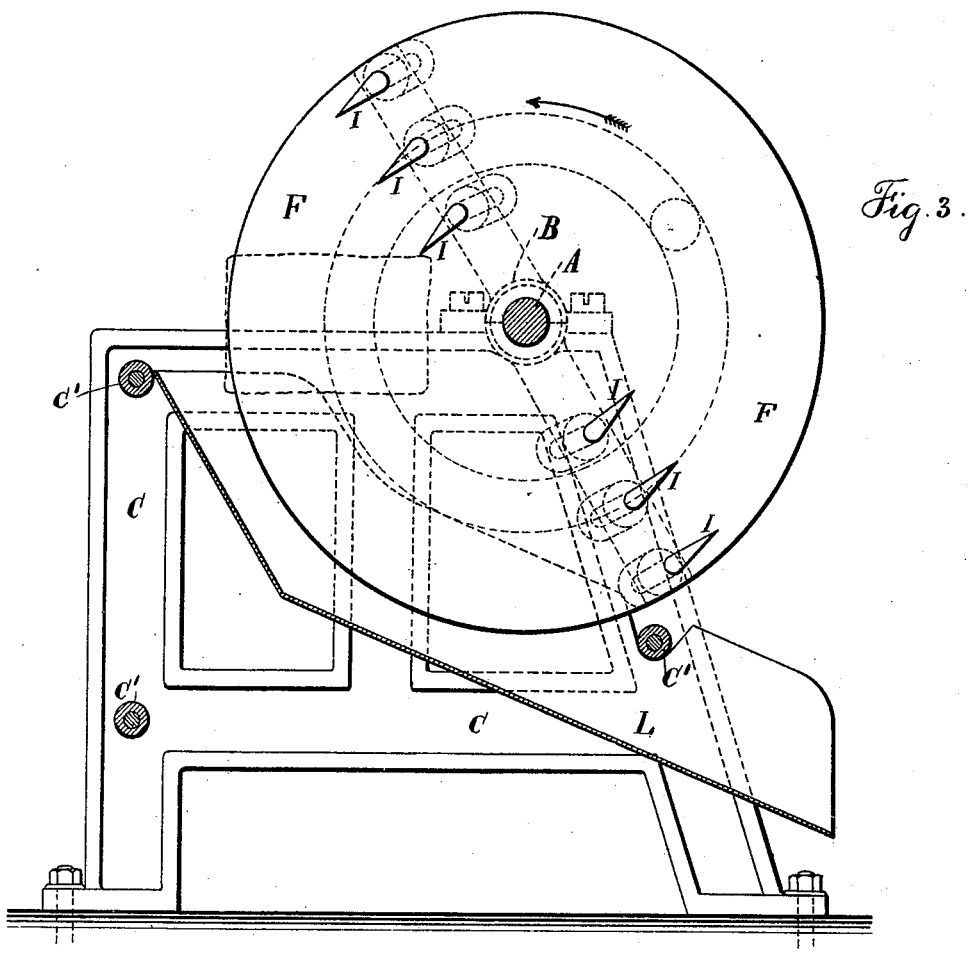

United States Patent Office.

WILLIAM TUNSTILL, OF BROOKLYN, NEW YORK.

ROTARY ICE-PICK.

SPECIFICATION forming part of Letters Patent No. 390,998, dated October 9, 1888.

Application filed December 16, 1887. Serial No. 258,049. (No model.)

*To all whom it may concern:*

Be it known that I, WILLIAM TUNSTILL, of Brooklyn, E. D., in the county of Kings and State of New York, have invented an Improved Rotary Ice-Pick, of which the following is a specification.

Machines have been made in which a disk carrying cutters is mounted upon a shaft, and against this the ice or other material to be cut is pressed, so that such material is removed in the form of slices or thin layers; but the ice is reduced too fine for the purpose of use with salt in freezing cream, &c., and in cases where the ice has been pulverized between jaws with teeth a similar difficulty arises, portions of the ice being reduced to a snowy consistency.

My present invention is intended to obviate these difficulties by using a rotary disk carrying one or more ranges of pointed claws, so that these claws are moved across the end of the cake of ice, and they scale off the ice in flakes and reduce it to comparatively small pieces without breaking the ice to a snowy consistency.

In the drawings, Figure 1 is a plan view representing my machine. Fig. 2 is a sectional elevation at the line $x\ x$, Fig. 1; and Fig. 3 is a sectional elevation at the line $y\ y$, Fig. 2.

The shaft A is supported in bearings B, upon the frames C. These frames are of any desired character, but preferably of metal with connecting-bars C'. Upon the shaft A is a handle, D, preferably connected with the fly-wheel E, so that the said shaft can be revolved by hand; but a pulley may be provided, so as to revolve the shaft by a belt to a suitable motor. Upon the shaft A is a disk, F, of the desired size and preferably of metal, and through this disk are one or more ranges of holes at an inclination to the plane of the disk, and upon the back of the disk are projections G, through which these holes pass, and a clamp-screw, H, or other suitable device is provided for each of these projections.

The claws I are preferably of tempered steel, with their ends tapered to penetrating points that are sufficiently bent to form hooks that penetrate the ice with facility, and at one side of the frame C is a chute, K, of a size adapted to receive the cakes of ice, and slightly inclined, so that the cake will slide down toward the revolving disk and needs but little pressure to feed it along as the cutting progresses. The claws I are similar to ice-picks, and in their action upon the ice they do not grind or pulverize the same, but they scale off the ice in flakes or pieces, and these pieces fall down upon the delivery-chute.

The clamp-screws H hold the claws after they have been adjusted to the proper positions, and by adjusting the claws or picks so that they project farther from the surface of the disk the pieces of ice will be flaked off of a larger size than they will be when the claws are projected a less distance. It is also preferable to provide a notched ledge, M, upon which the end of the cake of ice rests, and these notches coincide with the line of travel of the claws or picks, and the flakes of ice will be broken against this notched ledge without being ground into small pieces. There may be two or more ranges of these claws or picks upon the disk, and these claws may be placed in such a manner that the claws in one range strike the cake of ice between the places where the claws in the preceding range had passed through the ice.

I claim as my invention—

1. In a rotary ice-pick, the disk F, mounted upon a suitably-supported rotary shaft and provided with sockets G, and the claws I, individually fitted each to its own socket and adjustable therein by a clamp-screw, H, combined with the inclined chute K, to receive the block of ice to be broken up, substantially as described.

2. In an ice-breaking machine, the combination and arrangement, substantially as shown and described, of the shaft A and supporting-frame, the disk F, fast to said shaft, the socketed projections G, arranged at an incline on the back of the disk, the pointed claws I, individually arranged and adjustable in such projections and converging toward the axis of the disk, and the inclined ice-receiving and self-feeding shelf K, as set forth.

Signed by me this 8th day of December, 1887.

W. TUNSTILL.

Witnesses:
GEO. T. PINCKNEY,
WILLIAM G. MOTT.